US008234402B2

(12) United States Patent
Karandikar et al.

(10) Patent No.: US 8,234,402 B2
(45) Date of Patent: Jul. 31, 2012

(54) METHOD AND APPARATUS FOR REQUEST ROUTING

(75) Inventors: Shrikrishna Karandikar, Sunnyvale, CA (US); Ravi Duvvuri, Cupertino, CA (US); Juan Alemany, Sunnyvale, CA (US); Neelkanth Shashikant Natu, Santa Clara, CA (US); Anil Gopinath, Santa Clara, CA (US); Bharat Parekh, Sunnyvale, CA (US); Tom Herbert, San Jose, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 507 days.

(21) Appl. No.: 11/972,548

(22) Filed: Jan. 10, 2008

(65) Prior Publication Data
US 2008/0177897 A1  Jul. 24, 2008

Related U.S. Application Data

(63) Continuation of application No. 10/115,773, filed on Apr. 2, 2002, now Pat. No. 7,340,521.

(51) Int. Cl.
*G06F 15/173* (2006.01)
(52) U.S. Cl. .................... 709/238; 709/203
(58) Field of Classification Search .......... 709/203, 709/238
See application file for complete search history.

(56) References Cited

U.S. PATENT DOCUMENTS

| 5,963,915 | A | | 10/1999 | Kirsch | |
|---|---|---|---|---|---|
| 6,108,703 | A | * | 8/2000 | Leighton et al. | 709/226 |
| 6,163,779 | A | * | 12/2000 | Mantha et al. | 707/100 |
| 6,185,598 | B1 | | 2/2001 | Farber et al. | |
| 6,324,582 | B1 | | 11/2001 | Sridhar et al. | |
| 6,393,526 | B1 | * | 5/2002 | Crow et al. | 711/137 |
| 6,760,745 | B1 | | 7/2004 | Tan et al. | |
| 6,836,806 | B1 | | 12/2004 | Raciborski et al. | |
| 6,865,680 | B1 | * | 3/2005 | Wu et al. | 726/12 |
| 6,880,157 | B1 | * | 4/2005 | Havemose | 719/316 |
| 6,973,619 | B1 | * | 12/2005 | Hirose et al. | 715/234 |
| 7,089,563 | B2 | | 8/2006 | Nagel et al. | |
| 7,340,499 | B1 | * | 3/2008 | Casella | 709/201 |
| 2001/0043600 | A1 | * | 11/2001 | Chatterjee et al. | 370/390 |
| 2002/0061789 | A1 | | 5/2002 | Yim | |
| 2002/0161890 | A1 | * | 10/2002 | Chen | 709/226 |
| 2003/0093523 | A1 | | 5/2003 | Cranor et al. | |
| 2003/0182357 | A1 | | 9/2003 | Chess et al. | |
| 2003/0191822 | A1 | * | 10/2003 | Leighton et al. | 709/219 |
| 2004/0205119 | A1 | | 10/2004 | Streble et al. | |

* cited by examiner

*Primary Examiner* — Brian P Whipple
(74) *Attorney, Agent, or Firm* — Tarek N. Fahmi, APC

(57) ABSTRACT

A method and apparatus for dynamically encoding transactional information into a document over a network. The transactional information may include information about client data, object properties, or network conditions. The document may contain embedded links with embedded objects that can be requested by a client. The embedded links may contain URLs with associated domain names. The transactional information may be inserted into the domain name so that when the object request is subsequently translated by a DNS server, the DNS server can utilize the transactional information to intelligently translate the domain name into an IP address of a network device that can most advantageously serve the request.

9 Claims, 6 Drawing Sheets

METHOD AND APPARATUS FOR REQUEST ROUTING

CROSS REFERENCES TO RELATED APPLICATIONS

The present patent application is a Continuation of, claims priority to and incorporates by reference U.S. patent application Ser. No. 10/115,773, filed 2 Apr. 2002 now U.S. Pat No. 7,340,521.

FIELD OF THE INVENTION

An embodiment of the invention relates generally to network communications and, more specifically, to routing a request over a network.

BACKGROUND OF THE INVENTION

On the Internet, when a client requests a web-page from a network device, typically a web-server or a web accelerator, the conventional procedure follows several general steps. First, the client device requests a web-page object, typically in the form of a marked-up document, from the network device. Next, after the client receives the document from the network device, the client compiles the document. Within the document are contained "links" which are specified requests for objects necessary to compile the document into the web-page as seen on the client device.

As the client compiles the document, the links are processed one by one until all the requested objects are delivered to the client and the web-page is completed. The links contain uniform resource locators (URLs) that indicate network paths to the embedded objects. A portion of the URLs includes a shorthand address corresponding to the network devices according to a domain name system (DNS). That shorthand address is typically called a "domain name". When the client compiles the web-document, the domain names in the links must first be translated by a DNS server into IP addresses representing the actual network location of the network devices that possess the embedded objects.

Conventional procedures, however, suffer from particular drawbacks. For instance, typically, the marked-up document is generally written long before the client requests the document. As a result, the embedded links can only contain information that will be reliable in the future. Typically, that kind of information usually consists only of the domain name and the name of the embedded object. As a result, when the links are compiled, the DNS server cannot take into consideration current information about the client, or the network, in serving the embedded objects.

For instance, the conventional procedure does not take into account various network conditions during DNS translation. For example, two separate network devices may contain a particular object as requested in a particular link. One of the network devices may be particularly bogged down with requests while the other network device is relatively free of requests. When the DNS server translates the domain name to an IP address, however, the DNS server is not aware of the condition of the two network devices on the network. Consequently, the DNS server may blindly translate a domain name, in one of the links, into an IP address corresponding to the bogged down network device.

In addition, the conventional procedure does not take into account the information about the client during DNS translation. For instance, on a network, two network devices may contain a particular object, but one network device is very distant from the client while the other network device is very close. During DNS translation, however, the DNS server is unaware of the client's location and, consequently, may blindly translate the domain name into the IP address for the network device that is very distant.

Therefore, a need exists for a method of solving the problems found in conventional procedures.

BRIEF DESCRIPTION OF THE DRAWINGS

The present invention is illustrated by way of example and not limited by the figures of the accompanying drawings in which like references indicate similar elements and in which.

SUMMARY OF THE INVENTION

Figure 1:
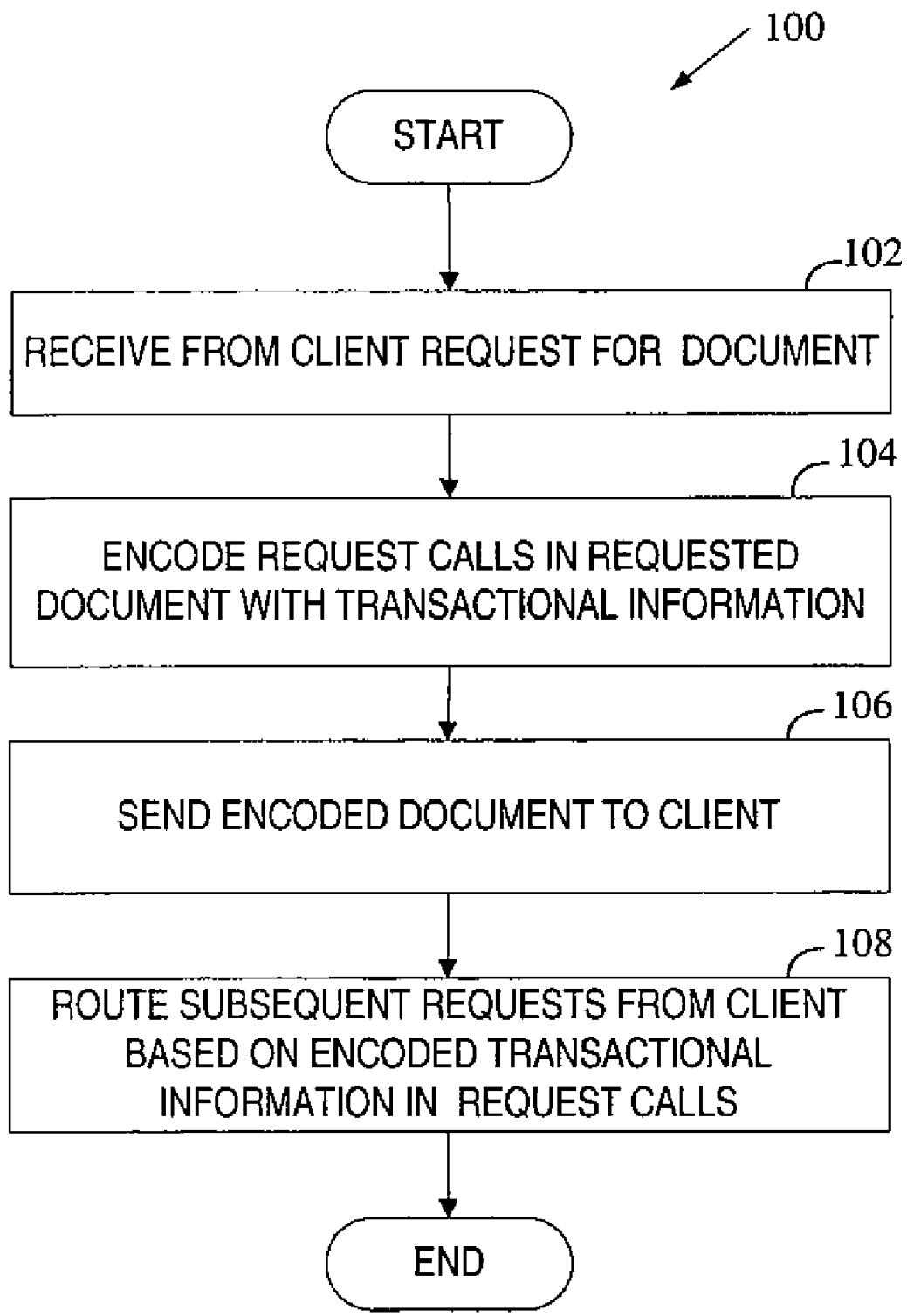
FIG. 1 is a flow diagram of one embodiment of a method of request routing according to the present invention.

A method and apparatus for dynamically encoding transactional information into a document. The transactional information may include information about client data, object properties, or network conditions. In one embodiment of the invention, the document may contain embedded links with embedded objects that can be requested by a client. The embedded links may contain URLs with associated domain names. The transactional information may be inserted into the domain name so that when the object request is subsequently translated by a DNS server, the DNS server can utilize the transactional information to intelligently translate the domain name into an IP address of a network device that can most advantageously serve the request.

DETAILED DESCRIPTION OF THE INVENTION

Described herein is a method and apparatus for request routing. In the following description numerous specific details are set forth. One of ordinary skill in the art, however, will appreciate that these specific details are not necessary to practice the present invention. While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Methods

FIG. 1 is a flow diagram of one embodiment of a method 100 of request routing according to the present invention. Method 100 begins, at processing block 102, with receiving from a client, over a network, a request for a document. Examples of documents might include self-contained documents (e.g., images, text files, video clips, etc.), or documents that reference other documents (e.g., container pages). Next, method 100 continues, at processing block 104, with encoding transactional information into the text of "request calls" embedded in the requested document. An exemplary method of encoding request calls is described in further detail in conjunction with FIG. 2 below. Next, method 100 continues, at processing block 106, with sending to the client the encoded document. Finally, method 100 concludes, at processing block 108, with routing subsequent requests from the client over the network, based on the encoded transactional information in the request calls. An exemplary method of routing subsequent requests from the client is described in further detail in conjunction with FIG. 3 below.

Referring to FIG. 1, processing block 102, the "request calls" contained in the requested document have been previously written, or embedded, into the document. The request calls make a reference to an external document. For example, types of document with request calls that are commonly requested over a network include XML and SGML documents, often called "container pages", that are commonly requested via the hypertext transfer protocol (http). Specifically, an SGML document (or, even more specifically, a hypertext markup language (HTML) document) may include various request calls, also known as markup processing instructions or embedded links, written into the document, such a hyperlink actions (e.g., A HREF, IMG SRC, etc.) or form processing actions (GET, POST, etc).

Now, referring to FIG. 1, processing block 104, the transactional information encoded into the request calls may include any one of client identity information, object request information, or network information.

Client identity information refers to information about the client device, or the user utilizing the client device, which can be obtained either directly from the user (e.g., via form data) or from various devices well known in the art that store specific data regarding the client (e.g., cookies). In particular, client information may include the identity and privileges of the user obtained through authorization with external services (e.g. LDAP, RADIUS, NTLM). Client identity information may include the IP address of the client, client authentication information (e.g., name, group, access), user credentials, etc.

Object request information refers specifically to the actual object requested by the client. The term "object" is a general term and may be defined in the general sense. Examples of object request information may include an object's name (e.g., logo), the protocol type of the object (e.g., .gif), etc.

Network information refers to information ascertainable by network devices that show information about the location of the client within the network.

Referring to FIG. 1 processing blocks 106 and 108, the sending of an encoded document back to the client thus enables the client to make subsequent requests by activating the encoded request calls in the encoded document. Once an encoded request call is activated by the client, the request may be intelligently routed, based on the transactional information, to a network device, such as an intermediary device, or a web accelerator, that will most advantageously serve the client request. Network conditions may be taken into consideration and evaluated against the transactional information to determine which network device can most advantageously handle the client request. Some network conditions to be considered, for example, may include the current location of the client within the network, current inoperative network devices, or current resource consumption on the network.

Figure 2:
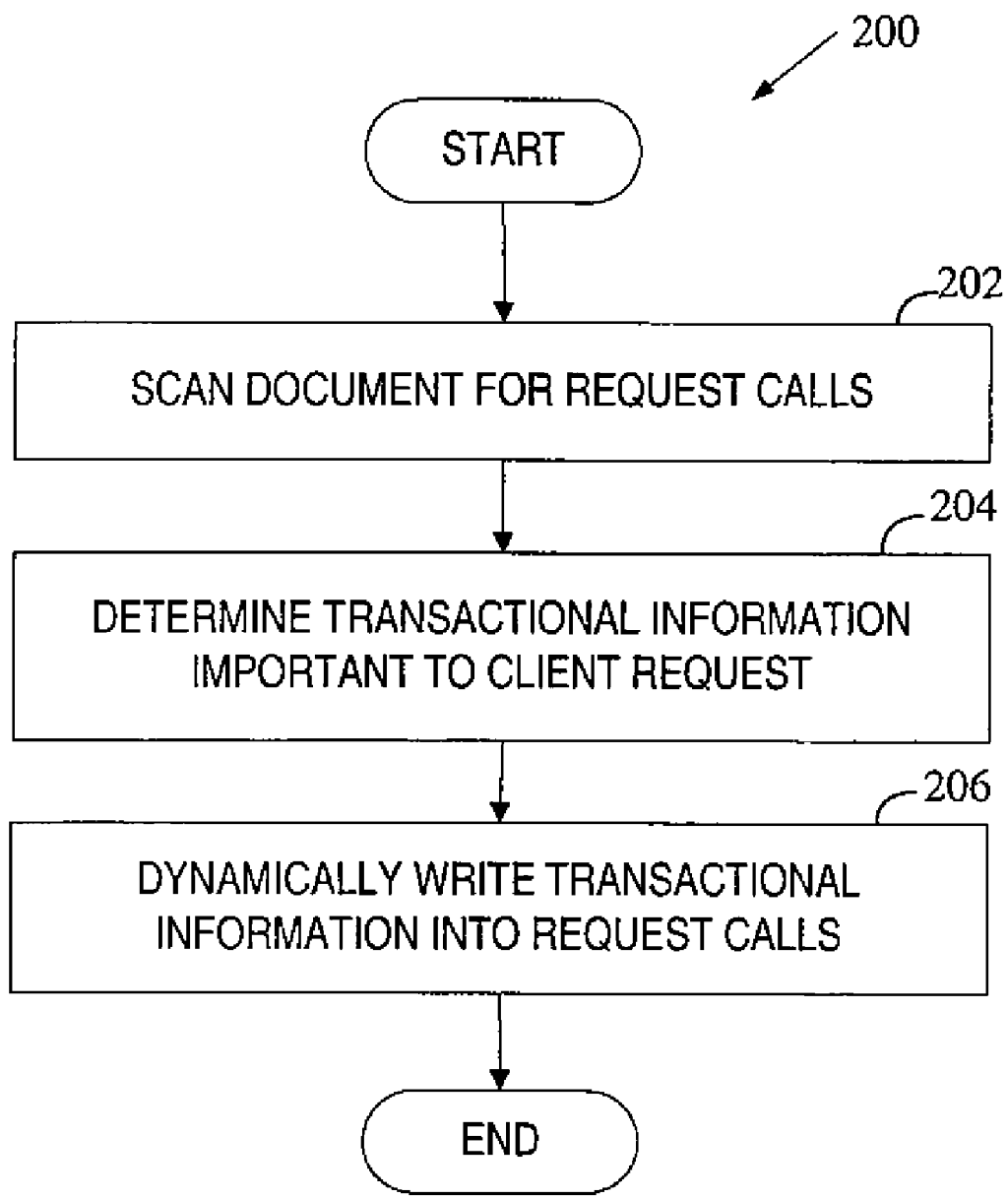
FIG. 2 is a flow diagram of one embodiment of a method for encoding request calls of a document.

FIG. 2 is a flow diagram of one embodiment of a method 200 for encoding request calls of a document. Method 200 begins, at processing block 202, with scanning the document for request calls.

Next, method 200 continues, at processing block 204, with determining what transactional information may be important to the client request. For instance, in an HTML document, an exemplary request call may be, <<img src=http://www.abcinc.com/images/logo.gif>>. Important transactional information for the exemplary request call, therefore, may include the object name ("logo") and the protocol type (".gif"). Other important transactional information may include the client's IP address, the client's location on the network, policies regarding time of request handling, and the client's authentication information.

Finally, method 200 continues, at processing block 206 with dynamically writing the important transactional information into the request call. The transactional information is dynamically written, or in other words, is written into the requested document no earlier than the time of the client request. One advantage of dynamically writing the transactional information into the document at the time of the client request is that specific client information, such as client identity or client authentication, may change, for example, depending on the actual client, the client's location, or the client's privileges at the time of the request. Such client information may only be ascertained at the moment of the request. Furthermore, that most current network conditions, such as current resource consumption on the network or inoperative network devices, may also only be ascertained at the moment of the request.

In one embodiment, the important transactional information may be written into the domain name of a URL referring to an embedded object, thus creating an encoded domain name. For instance, for the following request call <<img src=http://www.abcinc.com/images/logo.gif>>important transactional information may be written into the domain name as follows: <<img src=http://12.23.34.56(client IP address).logo(embedded object name).gif(protocol type).group(executive). user(vip).www.abcinc.com(domain name)/images/logo.gif>>.

Figure 3:
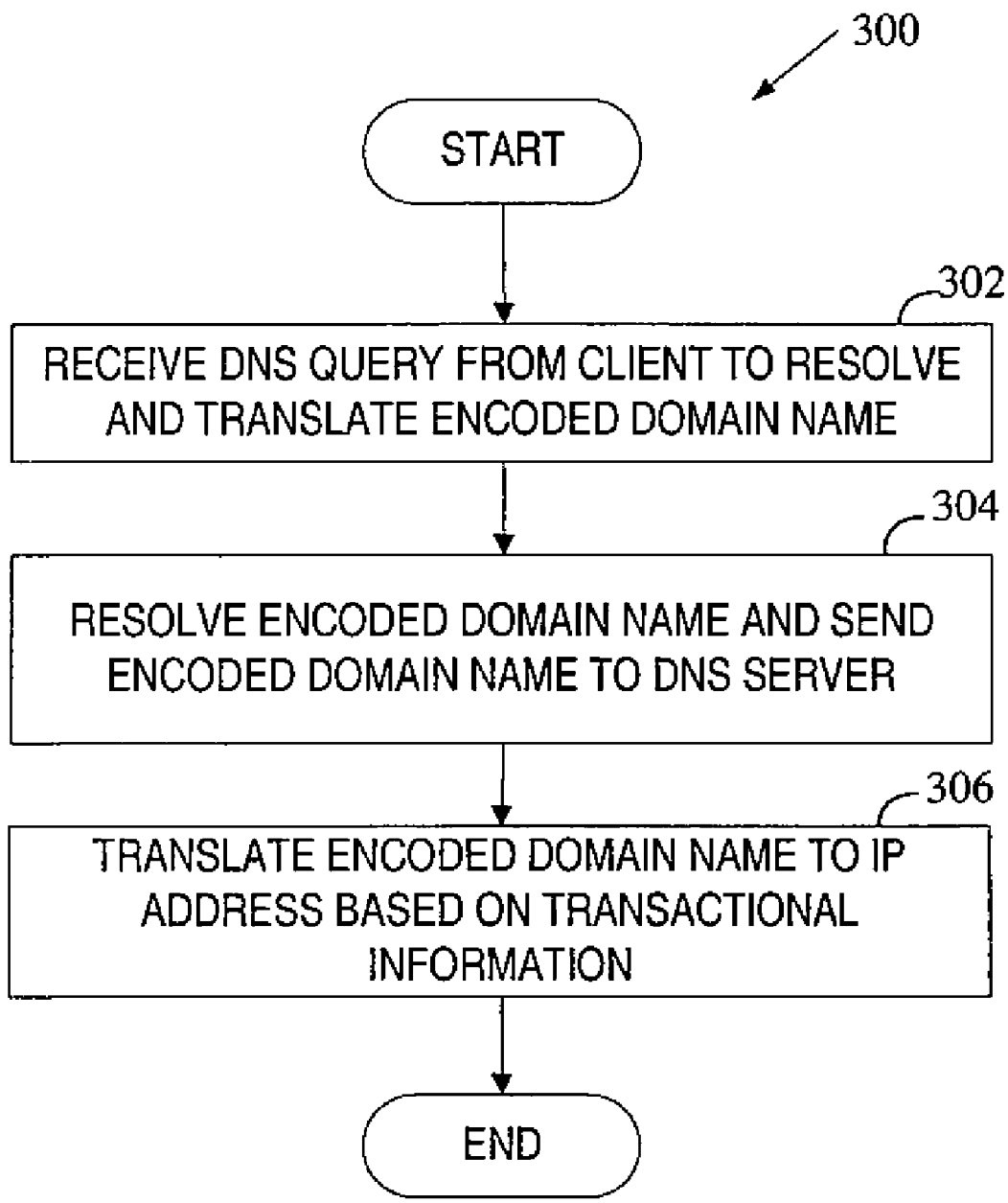
FIG. 3 is a flow diagram of an exemplary method for routing client requests according to one embodiment of the invention.

FIG. 3 is a flow diagram of an exemplary method 300 for routing client requests according to one embodiment of the invention. Method 300 begins, at processing block 302, with receiving a DNS query from a client, to resolve and translate an encoded domain name.

Next, method 300 continues, at processing block 304, with resolving the encoded domain name and sending the encoded domain name to a DNS server.

Next, method 300 may continue, at processing block 306, with translating the encoded domain name to an IP address based on the transactional information. The DNS server can include a listing of various IP addresses, corresponding to a plurality of intermediary network devices, that can serve the embedded object in the request call. An example of an intermediary network device, may be an accelerator, or any other such caching device known in the art.

The DNS server may logically, and intelligently, analyze the transactional information sent along with the resolved domain name. Depending on the transactional information included in the domain name, the DNS server may then determine the IP address that will most advantageously serve the request call.

For instance, if the DNS server knows the IP address of the client, then it knows the true network location of the client, regardless of whether the network's DNS server is co-located with the client's local DNS resolver. Consequently, the DNS server does not have to believe that the client's IP address is similar to that of the DNS resolver because the actual client IP address may be encoded into the resolved domain name.

Additionally, it can be advantageous for a DNS server to know the embedded object's name. The name allows the DNS server to choose an intermediary device on the network that is guaranteed to have a stored copy of the object. Consequently, it is useful for the DNS server to have a component that is aware of where the object has been pre-positioned and has mapping object names to specific intermediary devices on the network. In one embodiment, the DNS server is a part of a content distribution system.

If the encoded domain name has transactional information about the user's credentials, then other intermediary devices can also utilize that information when serving the client's requests. For instance, when the document (e.g., container page) is first requested, it is very likely to be served by an intermediary device (e.g., a web accelerator) that has the requested document. The intermediary device may have information about the identity of the user's privileges from an external authentication server (e.g., AAA server). Furthermore, the intermediary device is likely connected to, and has intimate knowledge of, several other intermediary devices on the network (i.e., a content distribution system). Therefore, since, in one embodiment, the intermediary device will be doing the dynamic rewrite of the request calls, it can know if the user should receive special treatment, such as VIP treatment, then write that information into the request calls. Subsequently, the DNS server can use that information to select the appropriate intermediary device to serve the client request. For instance, if the client is a VIP user, the DNS server would then translate the domain name to have an IP address for an intermediary device that is very close to the client, or the least loaded. Then, even more subsequently, if the DNS server does not remove the transactional information, when the selected intermediary device on the network receives the request, it will also have access to the encoded information and can accordingly respond without having to further query the client about some information that the client had already provided, such as authentication information.

Figure 4:
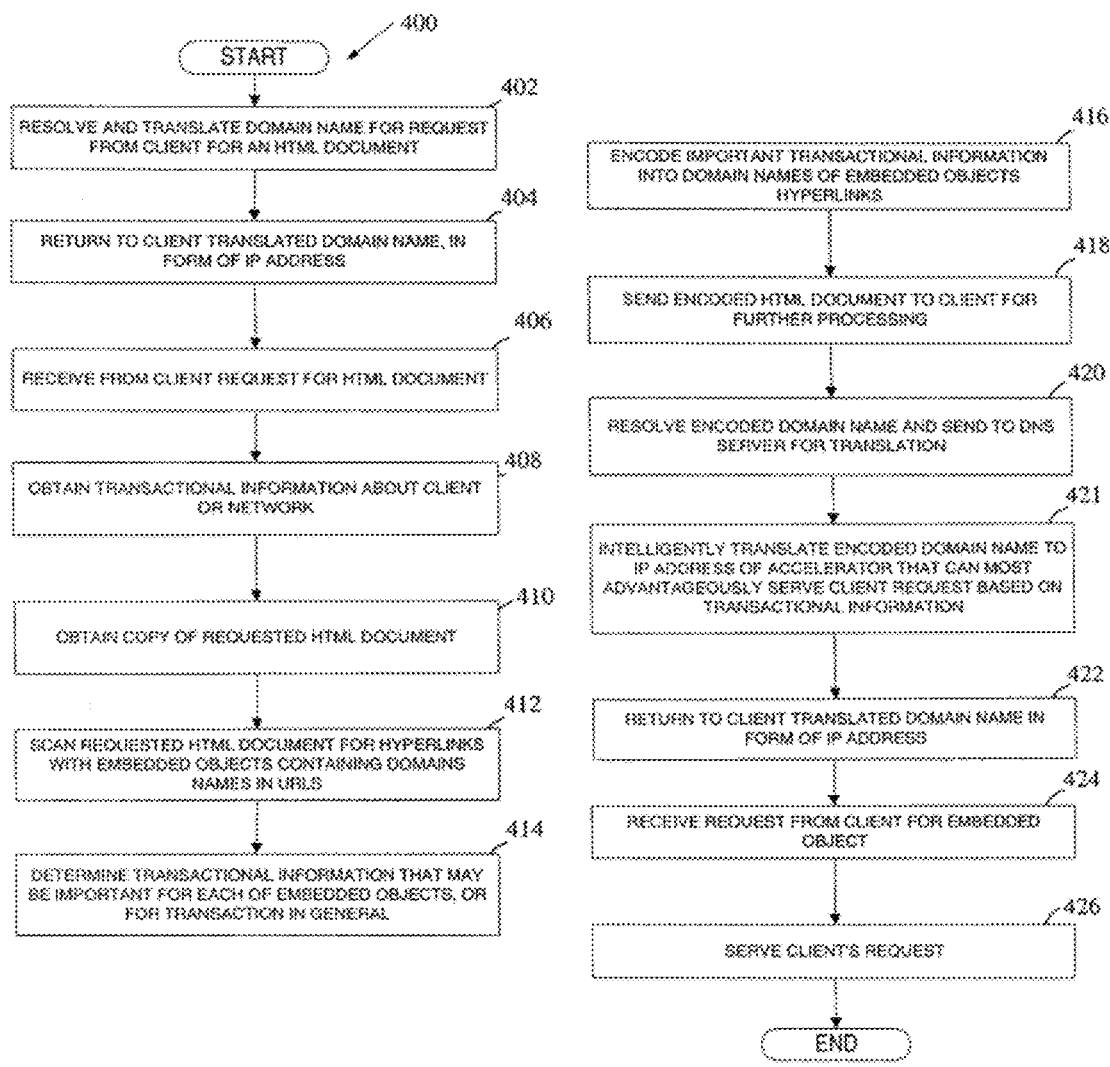
FIG. 4 is an illustration of a method for routing a request over the Internet, according one embodiment of the invention.

FIG. 4 is an illustration of a method 400 for routing a request over the Internet, according to one embodiment of the invention. Method 400 begins, at processing block 402, with resolving and translating a domain name for a request from a client for an html document. For example, the request for the html document may be initiated when the client's user activates a hypertext link for the html document while browsing the Internet. The hypertext link contains html codes, such as an HREF instruction, with an accompanying URL embedded into the HREF instruction. The URL includes a domain name that must first be resolved and translated before the request for the html document can be processed. Therefore, the browser separates the domain name from the URL text and sends it to a DNS resolver. The DNS resolver sends the domain name to a DNS server, and the DNS server translates the domain name into an IP address of a web accelerator device on the network.

Next, method 400 continues, at processing block 404, with returning the translated domain name, in the form of an IP address, to the client. Then, the client can proceed with requesting the html document using the IP address of the web accelerator. Therefore, method 400 continues, at processing block 406, with a web accelerator or intermediary receiving from the client a request for the html document.

Next, method 400 continues, at processing block 408, with obtaining transactional information about the client or the network. Typically, when a client makes a request from a web accelerator, the accelerator gathers a wealth of information about the client, such as the client's identity, location, and authentication status. In addition, the web accelerator may be linked to a plurality of other web accelerators in the network and can have intimate knowledge about the current network activity of the accelerators, such as current resource consumption. This information may also be termed transactional information. Transactional information may include almost any kind of information ascertainable by the web accelerator about the client, the network, or even about embedded objects within the requested html document, up to the very moment of the client request.

Next, method 400 continues, at processing block 410, with obtaining a copy of the requested html document. The accelerator may have the document stored in its internal object store, or cache. If not, the accelerator may need to obtain the html document from an origin content server or another accelerator.

Next, method 400 continues, at processing block 412, with scanning, or parsing, the requested html document for hyperlinks with embedded objects containing domain names in the URLs. For example, the html document may include, in the source code, hyperlinks for graphics, sounds, scripts, other html documents, etc., that will populate the html document once compiled and displayed to the user.

Next, method 400 continues, at processing block 414, with determining what transactional information may be important for each of the embedded objects, or for the client transaction in general. For instance, if a hyperlink contained instructions for a graphics object, important information might include the name of the graphic and the protocol type (i.e., file extension). In another instance, if the embedded object required transfer via a secure transaction, then the client's authorization information may be important to such a request. In general, client transaction information, such as the client's location, may be important for all kinds of requests for embedded objects.

Next, method 400 continues, at processing block 416, with encoding the important transactional information into the domain names of the URLs of the embedded objects. The result is a re-written, encoded html document.

Next, method 400 continues, at processing block 418, with sending the encoded html document to the client for further processing. The client's browser can then compile the html document which will begin to populate the graphical user interface by requesting embedded objects with encoded domain names, and the client can then activate any other hypertext links on the page also containing the encoded domain names. When the document is compiled, or when a client activates a hypertext link, the URL in that hypertext link must then be resolved and translated.

Thus, method 400 continues, at processing block 420, with resolving the encoded domain name and sending it to a DNS server for translation, and intelligently translating the encoded domain name to an IP address of an accelerator that can most advantageously serve the client request based on the transactional information, as shown at processing block 421. The encoded domain name is resolved, and the DNS server sees the encoded domain name along with the transactional information. In one embodiment, the DNS server has within it information regarding the IP addresses of the web accelerators in the network. In addition, the DNS server might have information about which objects were previously distributed to web accelerators in the network. Consequently, the DNS server can intelligently translate the domain name to an IP address that may most advantageously serve the client's request for the embedded object. The intelligent translation network takes into consideration important transactional information such as the proximity of the client, the client's authorization, current resource consumption on the network, the size of the embedded object, the date and time the request is being made, etc.—virtually almost any information that allows the DNS server to choose a web accelerator that will best serve the client's request.

An advantage of having a DNS server translate the encoded domain name is that the DNS server does not have to be co-located with an origin server. Consequently, translation can be performed at the last possible moment, and transactional information encoded into the domain, therefore, can be analyzed based on the latest network information available.

Next, method 400 continues, at processing block 422, with returning the translated domain name, in the form of an IP address, to the client. The client can then request the embedded object from the web accelerator that corresponds to the IP address as translated by the DNS server.

Next, method 400 continues, at processing block 424, with receiving a request from the client for an embedded object. In addition to the additional information afforded the web accelerator by the request information, the request may still contain transactional information therein that was not normally part of the static code before the URL was encoded. Thus, the transactional information may further assist the web accelerator to better serve the object. Thus, method 400 finally concludes, at processing block 426, with serving the client's request.

Apparatus

Figure 5:
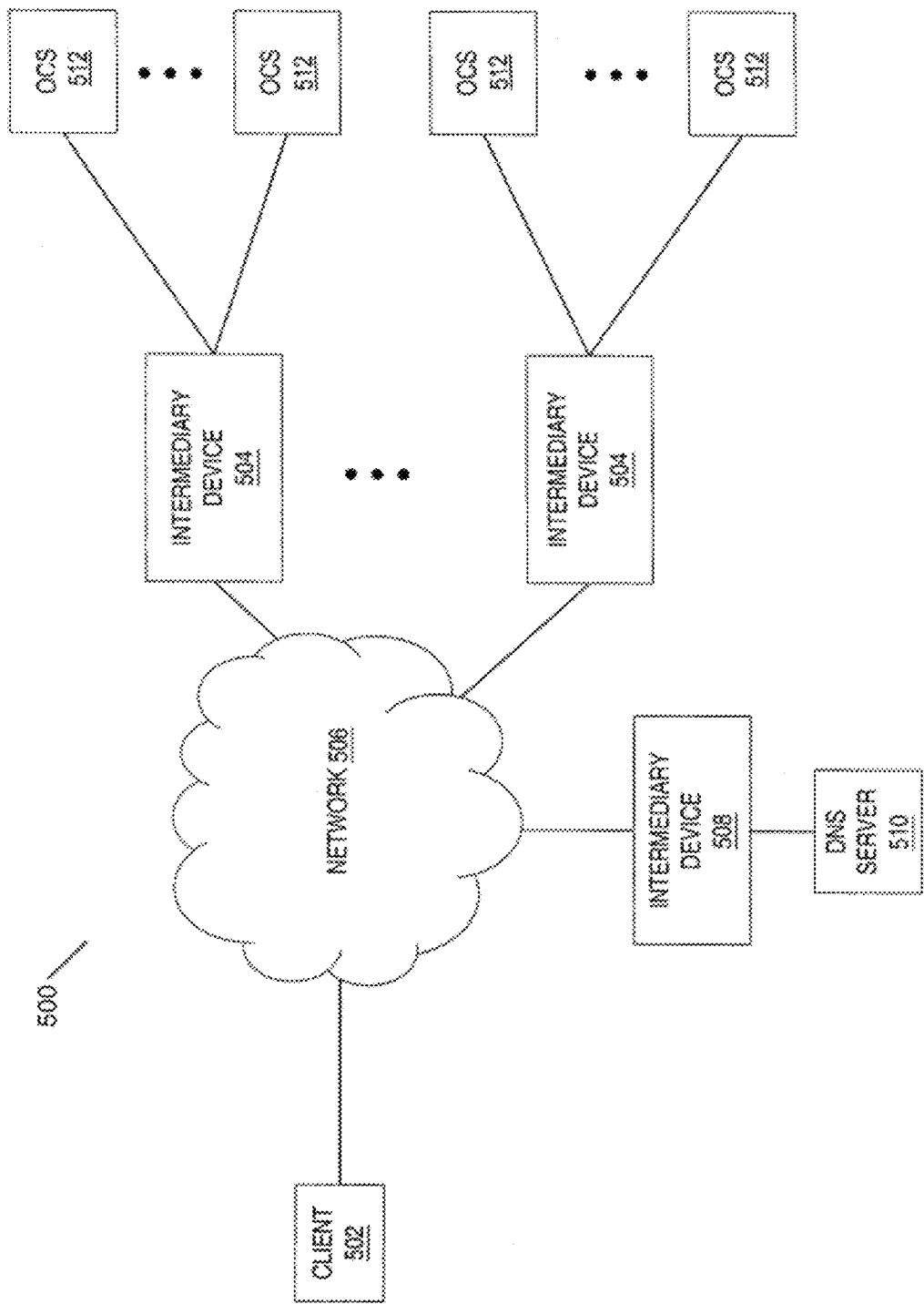
FIG. 5 is a diagram of one embodiment of a network system configured to route a request over a network.

FIG. 5 is a diagram of one embodiment of a network system 500 configured to route a request over a network. System 500 includes a client device 502 connected to a plurality of intermediary devices 504 via a network 506. The client device 502 ("client") is a computing device capable of making a request (e.g., for an object, service, etc.) over the network 506 and receiving a response for the request. For instance, the client 502, may be a personal computer (PC), a hand-held device or personal digital assistant (PDA) type device, a cell-phone, etc. In one embodiment, the client is a PC running a web browser application and may make requests for objects over the network 506 by utilizing the web browser. The client 502 is configured to make a request for a document over a network, said document including therein a plurality of request calls.

The intermediary devices 504 and 508 are computing devices capable of receiving and responding to the request made by the client 502. In one embodiment, the intermediary devices 504 are web accelerators, with internal object stores housing objects that may be requested by the client 502. In one embodiment, the plurality of intermediary devices 504 are configured to obtain transactional information and dynamically encode the transactional information into the request calls of a document requested by the client 502. In one embodiment, the request calls include domain names, and the transactional information is dynamically encoded into the domain name, thus producing a plurality of encoded domain names.

The intermediary device 508 is a domain name service (DNS) resolver, connected to a DNS server 510. In one embodiment, the DNS server 510 is configured to read encoded domain names and translate them, based on the transactional information, into IP addresses corresponding to the plurality of intermediary devices on the network that will most advantageously serve the request calls.

The network 506, may be any kind of network known in the art. For instance, network 506 may be a private network, such as an intranet, an extranet, a local area network (LAN), or a wireless network. The network 506 may also be a public network, such as the Internet. Furthermore, the network 506 may be a combination of private and a public networks. In the interest of brevity, however, the general term "network" may be used hereafter to mean any kind of medium over which the client 502 and the intermediary device 504 communicate.

System 500 may further comprise a plurality of servers 512 that provide content to the intermediary devices 504. The purpose of the plurality of servers 512 is to provide requested objects to the intermediary devices 504 when the intermediary devices 504 do not have the objects in their object stores. The intermediary devices 504 have the ability to query any one of the plurality of servers 512 for the object. Servers 512 are computer devices that can receive the query and respond in kind with the requested object.

Computer Architecture

Figure 6:
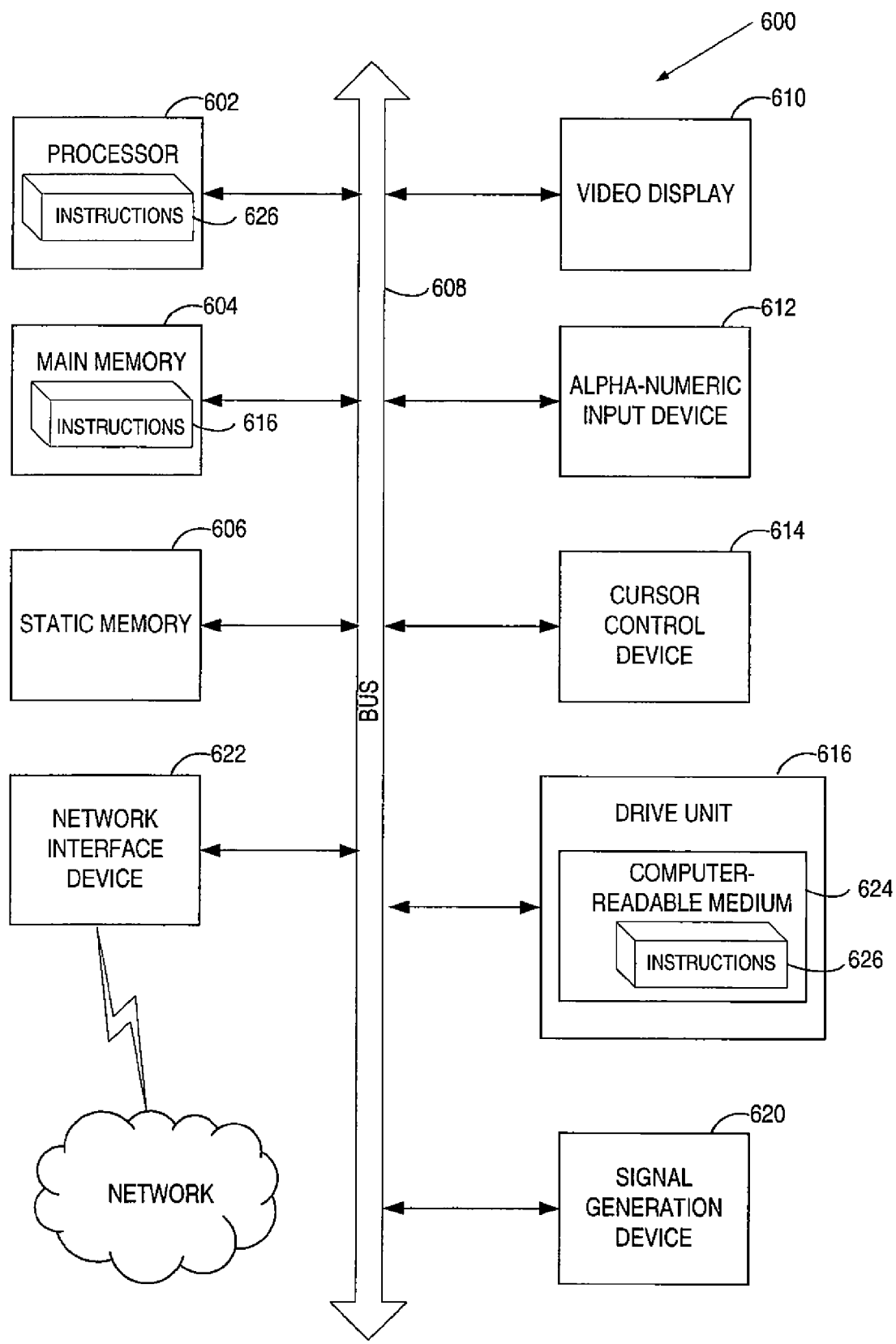
FIG. 6 shows a diagrammatic representation of a machine in the exemplary form of a computer system within which a set of instructions, for causing the machine to perform any one of the methodologies discussed above, may be executed.

FIG. 6 shows a diagrammatic representation of machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also may include an alphanumeric input device 612 (e.g., a keyboard), a cursor control device 614 (e.g., a mouse), a disk drive unit 616, a signal generation device 620 (e.g., a speaker) and a network interface device 622.

The disk drive unit 616 includes a computer-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 622. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for request routing has been described. The scope of the present invention should only be measured by the claims, which follow.

What is claimed:

1. A method, comprising routing a request for an object to a network device other than an origin server for said object according to information concerning a client requesting said object which is determined to be important to the request, transactional information regarding said object, and network conditions, said information concerning the client having been obtained from a Web address embedded in a Web document, the Web address specifying the information concerning the client and a location at which the object can be found, said network device having been determined to be guaranteed to have a copy of said object according to a mapping that identifies objects stored at network devices.

2. The method of claim 1, wherein the information concerning the client includes a network address of the client.

3. The method of claim 1, wherein the information concerning the client includes information authenticating the client.

4. The method of claim 1, wherein the information concerning the client was added to the Web address following a request by the client for a document containing an embedded request call pointing to the object.

5. The method of claim 4, wherein the information concerning the client includes a network address of the client.

6. A method, comprising receiving a request for a Web document that includes a request call specifying a Web address of an object embedded therein, dynamically encoding information regarding an entity requesting the Web document into the request call embedded within the Web document, dynamically encoding transactional information regarding the object into the request call embedded within the Web document, transmitting the Web document with the encoded request call therein, and routing a request for the object identified in the encoded request call to an intermediary network device guaranteed to store a copy of the object specified in the request call according to the transactional information in the encoded request call by determining, using said transactional information, an identity of said intermediary network device from a mapping that identifies objects stored at intermediary network devices.

7. The method of claim 6, wherein routing the request for the object identified in the encoded request call further includes using the information regarding the entity expressed in the encoded request call.

8. The method of claim 6, wherein routing the request for the object identified in the encoded request call further includes using network conditions that relate to the entity expressed in the encoded request call.

9. The method of claim 6, wherein dynamically encoding information regarding the entity includes locating the request call within the document, determining information regarding the entity that is important to the request, and writing the information determined to be important to the request into a domain name included in the request call.

* * * * *